Patented Oct. 17, 1933

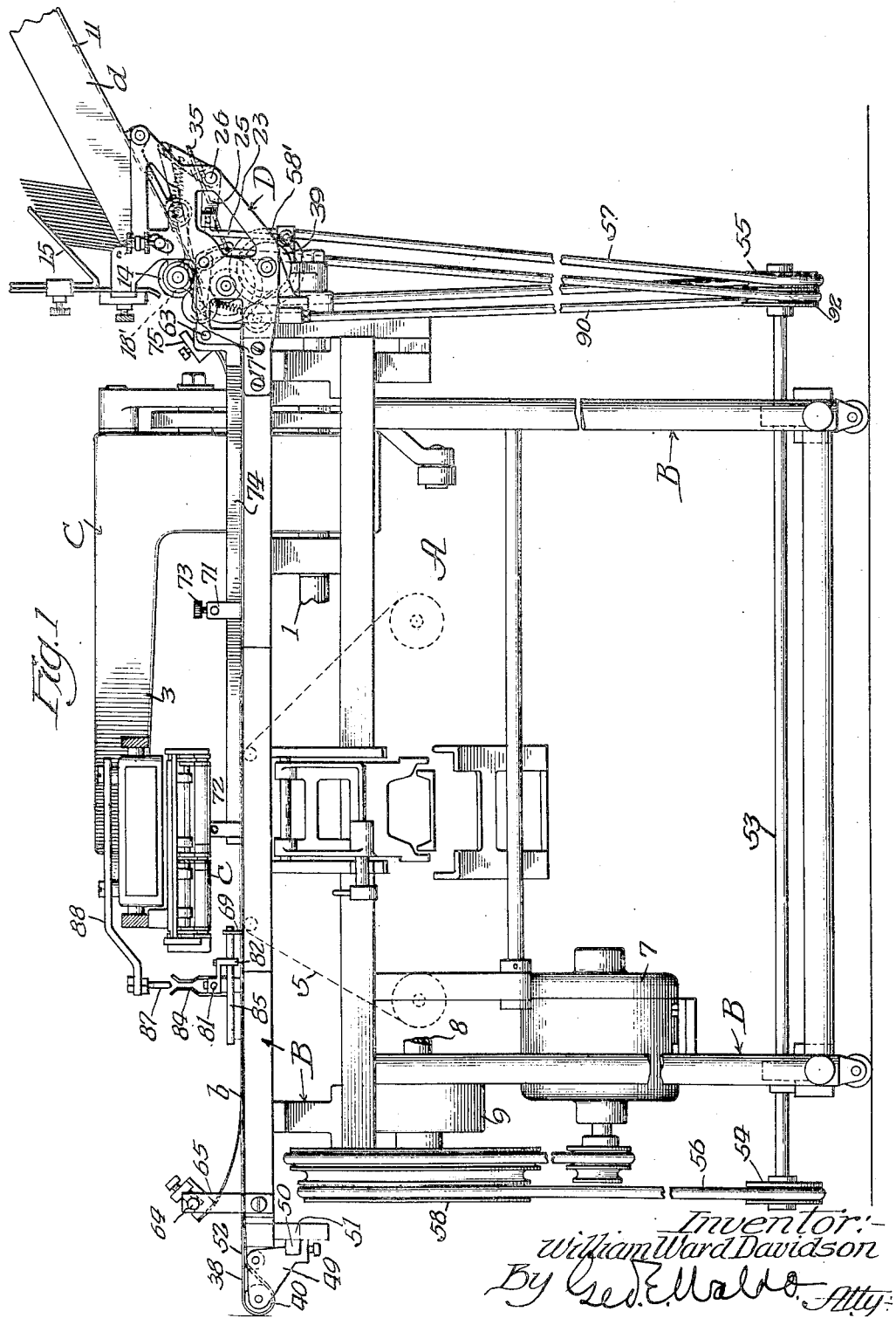

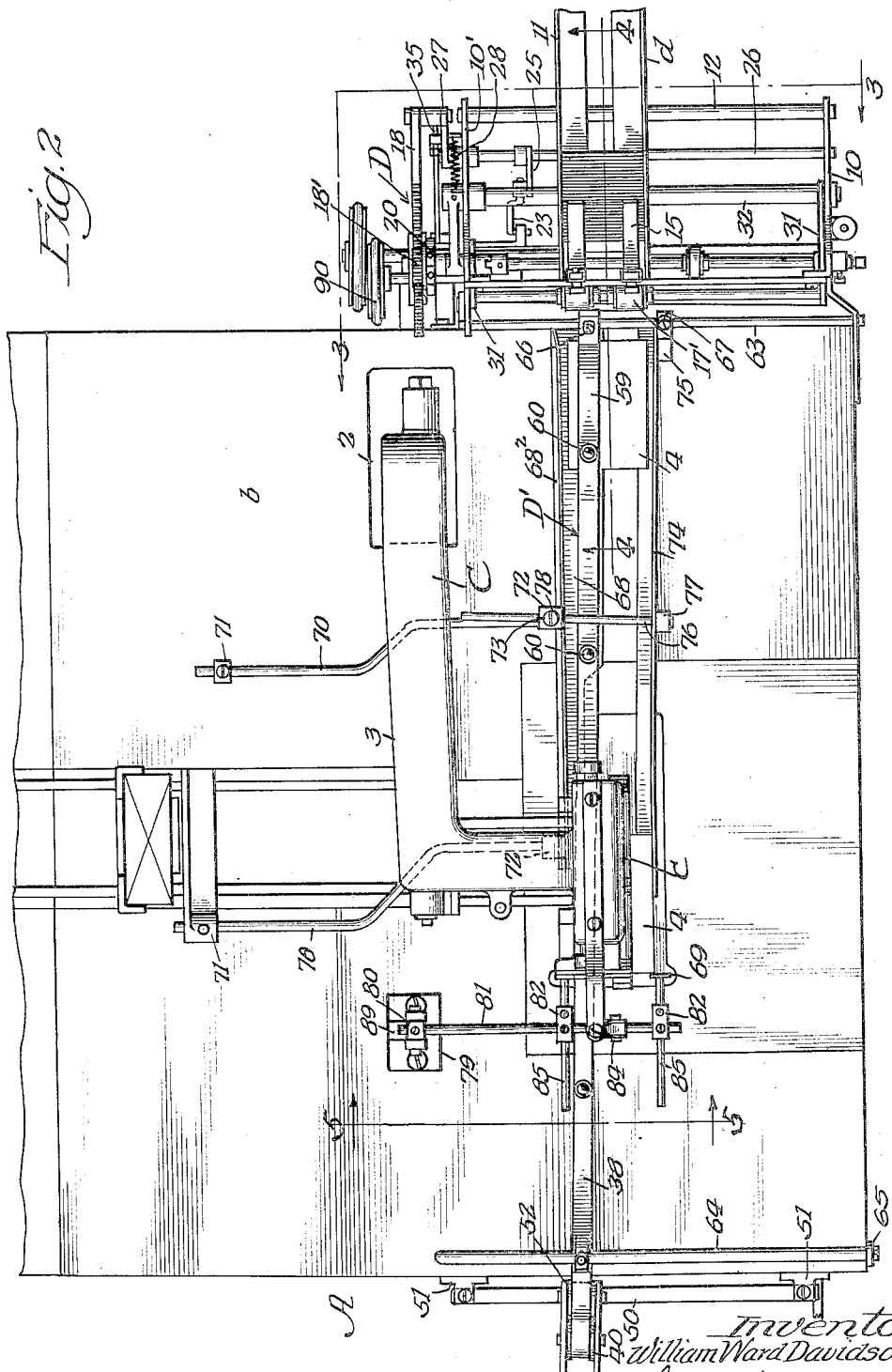

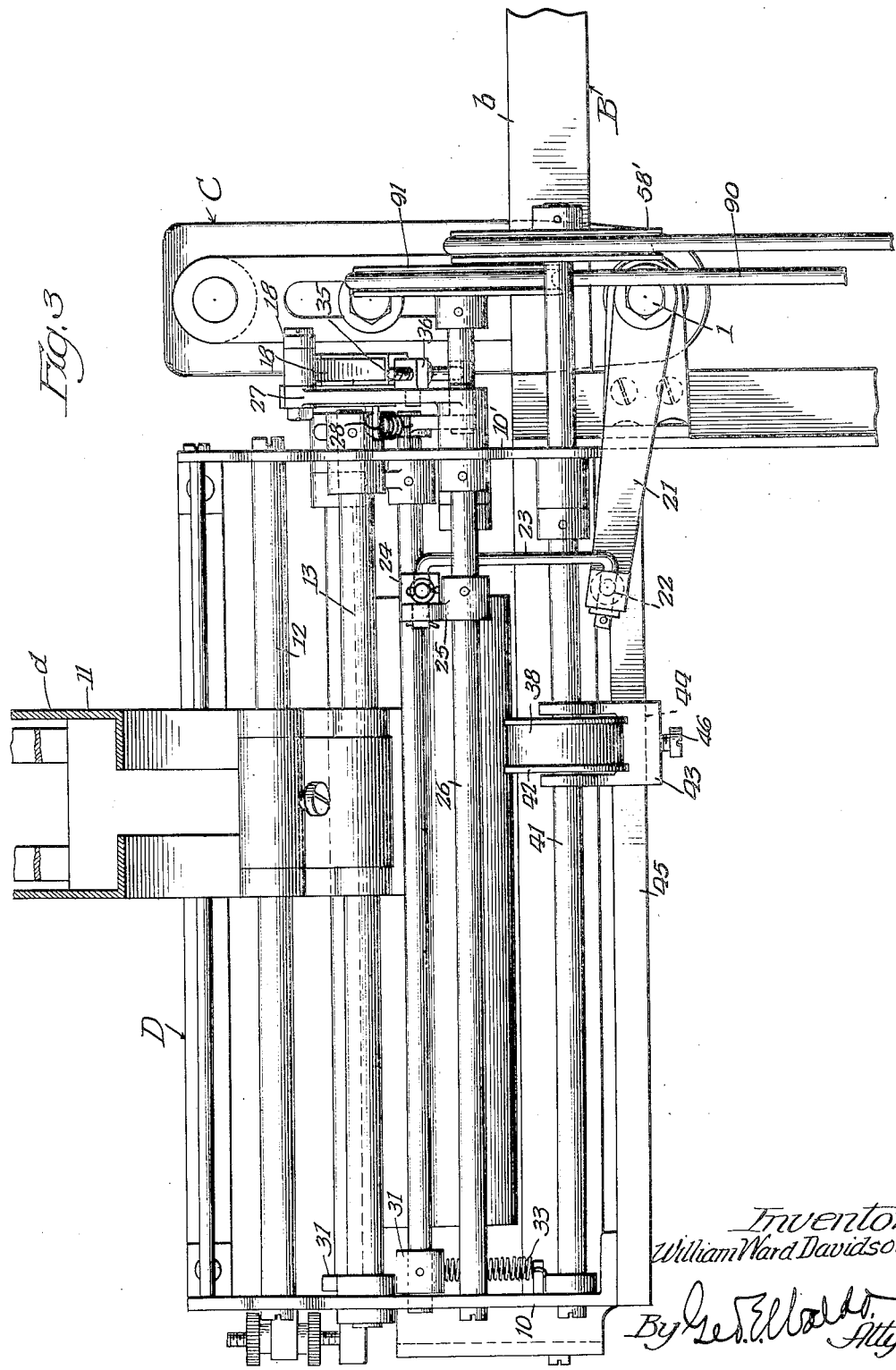

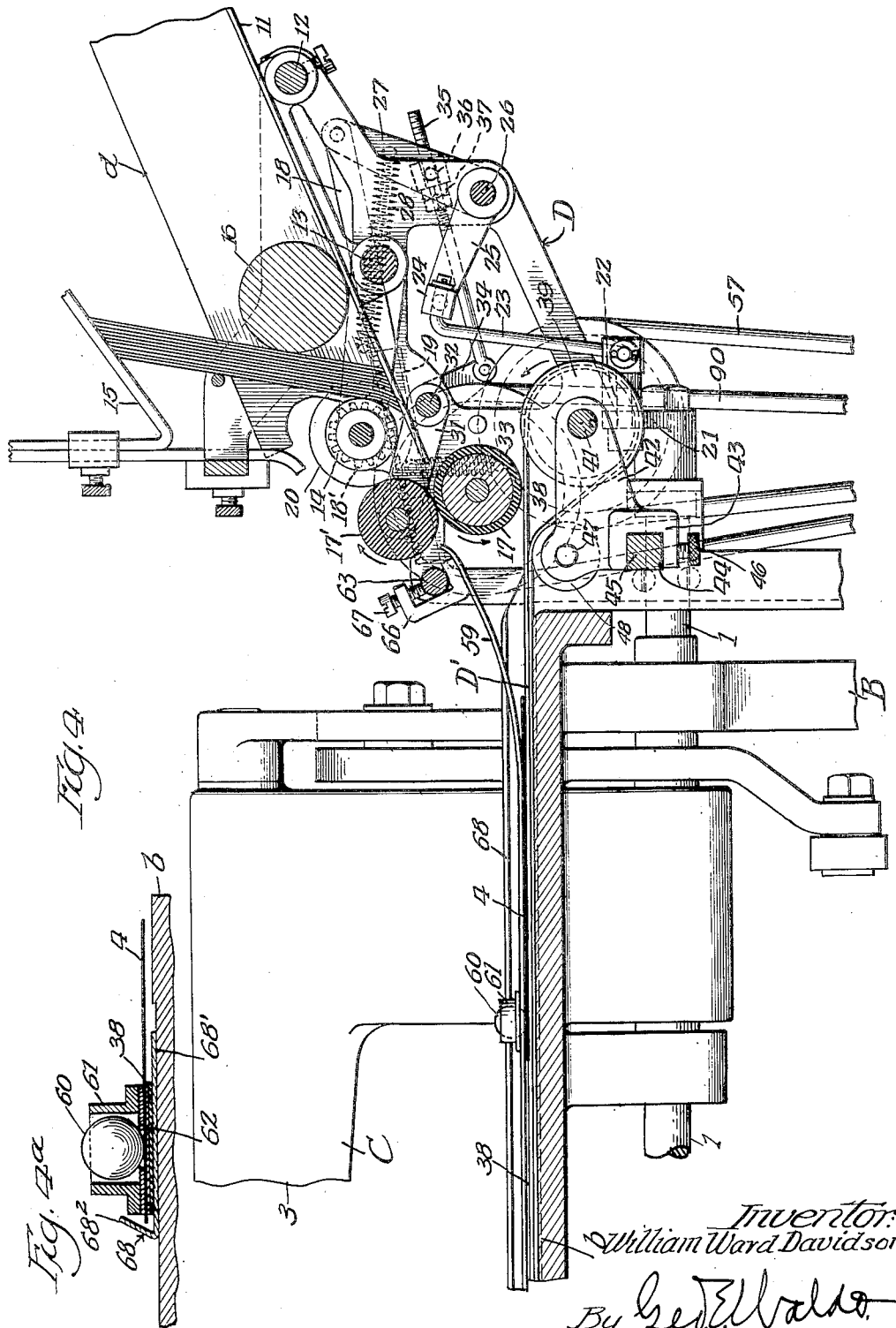

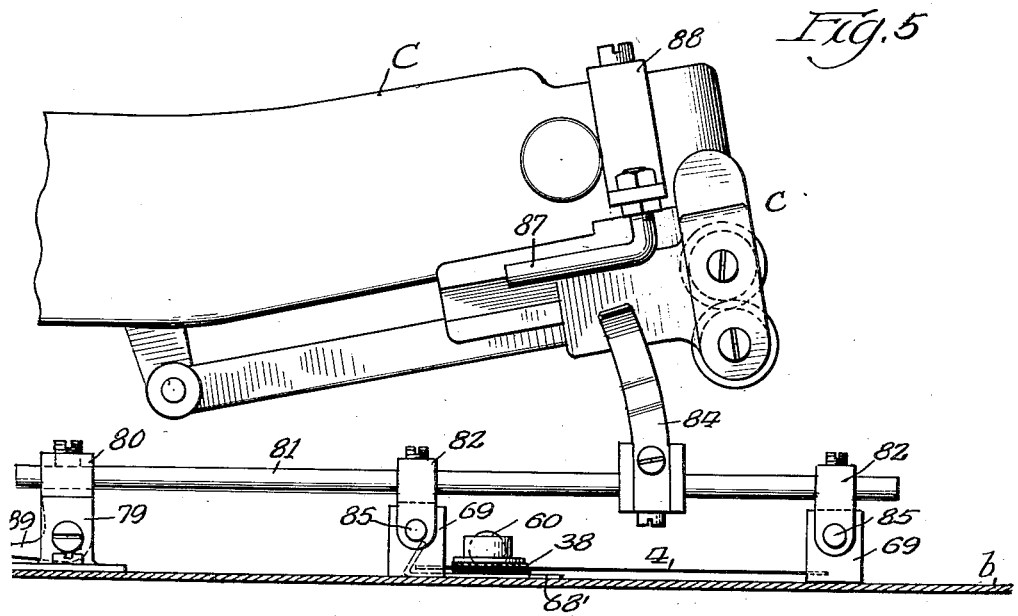
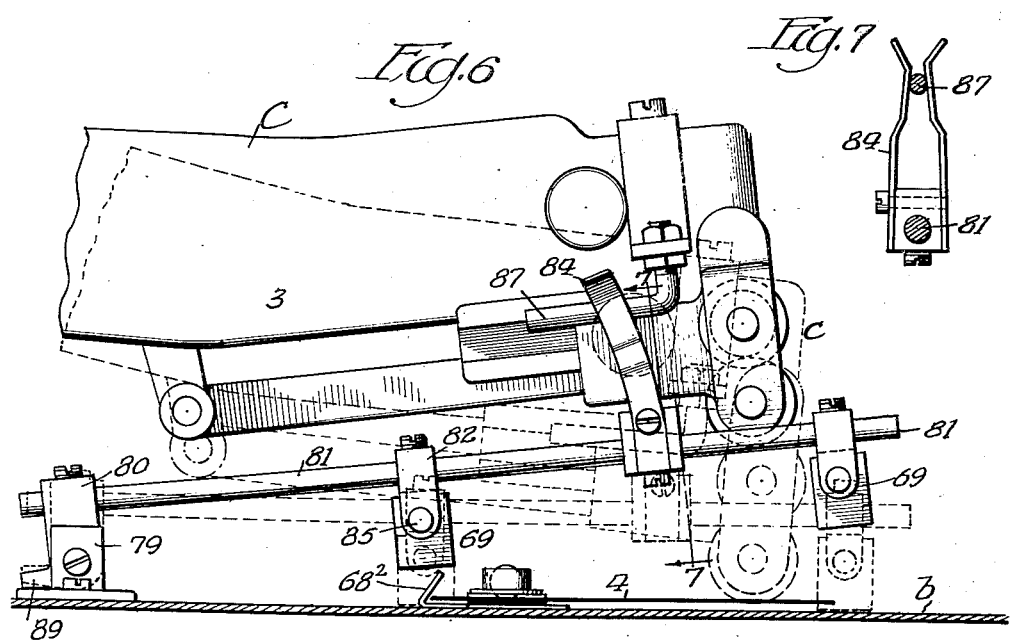

1,930,511

UNITED STATES PATENT OFFICE 1,930,511

BLANK SEPARATING AND CONVEYING APPARATUS

William Ward Davidson, Evanston, Ill., assignor to Davidson Manufacturing Company, Chicago, Ill., a corporation of Wisconsin Application November 7, 1931. Serial No. 573,665

18 Claims. (Cl. 101—279)

This invention relates to blank separating and conveying apparatus particularly designed and adapted for feeding blanks, as cards, envelopes, sheets of paper, signatures and the like, to imprinting machines—particularly addressing machines—and for discharging them therefrom, of the general type comprising a supporting frame having a flat top, a rock shaft rotatably mounted in bearings therein, an imprinting head secured to said rock shaft so as to oscillate therewith and which overhangs the top of said frame, and imprinting means secured to said head for imprinting or otherwise functioning with respect to blanks traversing said machine.

The primary object of the invention is to provide blank separating and conveying apparatus for the purpose specified, which will be simple in construction, efficient and dependable in operation, which is readily adaptable for feeding blanks of different thickness, finish and stiffness, and which will have very large capacity for feeding and imprinting blanks as compared with hand feeding, or any mechanical feeder devised for the purpose of which I have any knowledge, and which may quickly and conveniently be converted to provide for hand feeding.

Blank separating and conveying apparatus embodying my invention and improvements and the means for correlating the operation of said imprinting machine and blank separating and conveying apparatus to effect the objects of the invention, comprise the various features, combinations of features and details of construction, hereinafter described and claimed.

In the accompanying drawings, in which the invention is fully illustrated,

Fig. 1 is a view of my improved blank separating and conveying apparatus, shown as applied in use to and in conjunction with the co-operating parts of a well known type of a commercial addressing machine shown, respectively, in side and front elevation.

Fig. 2 is a top-plan view thereof.

Fig. 3 is an enlarged, fragmentary view from the position 3—3 of Fig. 2.

Fig. 4 is an enlarged, fragmentary view on the line 4—4 of Fig. 2.

Fig. 4a is an enlarged, fragmentary detail view.

Fig. 5 is an enlarged, fragmentary, sectional elevation from the position 5—5 of Fig. 2, showing stop mechanism for arresting movement of conveyed blanks and for defining imprinting position thereon, said stop mechanism being in operative position.

Fig. 6 is a view similar to Fig. 5, showing the parts of the stop mechanism in inoperative position; and Fig. 7 is a detail view of a spring clip forming part of said stop mechanism, from the positions 7—7 of Fig. 6.

For purposes of clear and definite illustration, I have, in the drawings, shown my invention and improvements as applied to or embodied in a well known form of commercial addressing machine, but to avoid confusion and to render the accompanying description clear and readily understood, I have shown only those parts of said machine which co-operate directly with my improved blank separating and conveying apparatus to effect the objects of the invention.

Said machine, however, forms the subject-matter of an application for U. S. Letters Patent filed in the Patent Office on or about the 5th day of January, 1931, numbered serially 506,633, in which said machine is fully shown, described and claimed and to which reference is here made for a description in detail of parts thereof not herein shown and described.

Said machine, designated as a whole A, comprises a suitable frame designated as a whole B, made in the form of a table and having a flat top b.

Excepting as appears in the drawings, the operative parts of the machine A are mounted beneath the table top b and comprise a rock-shaft 1 rotatably mounted in bearings formed in brackets secured to and which depend from the underside of said table top, a head C secured to said rock-shaft so as to oscillate therewith, which extends upwards through an opening 2 in the table top and which comprises an arm 3 which extends laterally over the said table, and mounted at the outer end of which is imprinting means designated as a whole c, adapted for imprinting upon blanks 4 presented thereto by means presently described, through the medium of a usual copying ribbon indicated at 5, and metal plates, not shown, bearing the matter to be imprinted on said blanks, fed to position beneath the blanks when in imprinting position, and in such relation that the ribbon will pass between said blanks and plate as fully shown and described in said application, Serial No. 506,633.

In operation, oscillation is imparted to the rock-shaft 1 to raise the imprinting means carried by the arm 3 of the imprinting head by driving connection with a source of power as shown by an electric motor 7 mounted on the frame B of the imprinting machine, said driving connection comprising an intermediate shaft 8 rotatable in bearings formed in the frame B, which is belt driven from said motor through a speed reducing gear indicated at 9, Fig. 1, all as fully shown and described in said application, Serial No. 506,633.

In accordance with my invention, the means for separating and feeding blanks to the imprinting means c of the machine A, comprises, in the first instance, a blank separating machine designated as a whole D, mounted in fixed position on the frame of said imprinting machine, and, second, blank conveying means designated as a whole D', mounted in association with said blank separating machine and arranged to receive separated blanks therefrom and to deliver the same to the imprinting means to the machine A and to discharge imprinted blanks from said machine.

As shown, said blank separating machine is of a known type, comprising spaced frame plates 10, 10', supported in fixed position relative to the machine A, being preferably secured directly to the right hand end of the top b thereof—as viewed from the front, Fig. 1—a pack receptacle designated as a whole d, consisting of spaced angle bars 11 adjustable transversely on rods 12 and 13 supported by the frame plates 10, 10', a separator roll 14 of the friction type, rotatably mounted at the front end of the blank receptacle d so as to be adjustable towards and from the bottom thereof, means—specifically, an adjustable gauge bar 15 and a movably supported weight 16 for supporting a pack of blanks in edgewise position on the bottom of the receptacle with the front blank in contact with the separator roll 14, and for advancing said pack of blanks yieldingly towards said separator roll, and for varying the inclination of the pack of blanks contained in said receptacle relative to the bottom plate thereof—formed by the inwardly extending flanges of the angles 11—pull-out rolls 17, 17' mounted in association with the separator roll 14, of which the roll 17 is rotatable on a fixed axis and the roll 17' is movably supported, means for imparting movement to said movably supported roll towards and from the roll 17 to permit the advancing edges of blanks separated from the pack contained in the blank receptacle by the separator roll 14, to enter freely between said pull-out rolls, means, presently described, for rotating the roll 17 continuously in operation, and means for imparting intermittent rotation to the separator roll 14, said means comprising a reciprocating rack bar 18, a pinion 18', on the shaft of said separator roll, a pivoted yoke-shaped bracket 19 by which said rack bar is slidably supported with the teeth thereof in engagement with the pinion 18', and a ratchet gear 20 for securing said pinion to the shaft of the separator roll on the actuating stroke of said rack bar.

As regards its construction and operation and excepting as hereinafter particularly described and pointed out, said feeder D is substantially a reproduction in detail of the feeder shown, described and claimed in U. S. Letters Patent No. 1,741,451, dated December 31, 1929, issued to Davidson Manufacturing Company as assignee of an application filed by me on July 23, 1927, Serial No. 207,934, to which reference is here made for a description in full detail thereof and of its constituent parts.

In accordance with my invention, reciprocating movement is imparted to the rack bar 18 by suitable operating connection with the rock shaft 1 of the machine A, as follows, see particularly Figs. 1, 3 and 4;—secured to the end of said rock shaft proximate the feeder D is an arm 21, a stud 22 pivoted to the free end of which is connected by a link 23 with a stud 24 pivoted to an arm 25, pinned or otherwise secured to a shaft 26 rotatable in bearings in the side frames 10, 10' of the blank separating machine D, to which an arm 27 is also pinned or otherwise secured, to the free end of which an end of said rack bar 18 is pivoted. To reduce the increased duty on the motor 7, incident to actuating the separator roll 14, a coiled spring 28 is applied to the arm 27, opposite ends of which are attached to pins secured to said arm and the side frame of the blank separating machine, the relation being such that said spring will tend to turn said lever arm pivotally in a direction to move the rack bar 18 endwise to actuate the separator roll 14 to discharge a blank from the pack receptacle.

As shown, the pull-out roll 17' is rotatably mounted in bearings formed in the outer ends of arms 31 secured to a shaft 32 rotatably mounted in bearings in the frame plates 10, 10' of the blank separating machine D. When free to respond thereto, the movably supported pull-out roll 17' is maintained yieldingly in contact with the lower roll 17, by a coiled spring 33 opposite ends of which are attached to pins secured in an arm 31 and in a fixed part of the frame of said blank separating machine.

In operation, the shaft 32 is adapted to be rotated against the force of the spring 33 to raise the upper pull-out roll 17' out of contact with the relatively fixed lower roll 17 by an arm 34 secured to the shaft 32 pivoted to the outer end of which is a rod 35, the free end of which is slidably fitted to a hole formed in a headed stud 36 pivoted to the arm 27, which is adapted to contact with a rigid shoulder on said rod as the arm 27 is turned pivotally to impart endwise movement to the rack bar 18 in a direction to rotate the separator roll 14 to discharge a blank from the blank receptacle. As shown, said rigid shoulder is formed by a nut or collar 37 on said rod and which, preferably, has screw-threaded engagement therewith, thus rendering said shoulder adjustable to provide for raising said pull-out roll 17' more or less, as may be desired.

Blanks discharged from the pack receptacle d are delivered by the pull-out rolls 17 and 17' to the conveyor D' which, in turn, delivers said blanks into position to receive an impression from the imprinting means c. As best shown in Fig. 4, said conveyor comprises an endless feed tape or belt 38, which is adjusted to flanged pulleys 39 and 40. The pulley 39 is splined or otherwise secured to a shaft 41 rotatably mounted in bearings in the side frames 10, 10' of the blank separating machine, so as to rotate therewith and also, preferably, so as to be axially adjustable thereon. As shown, said pulley is confined between spaced lugs 42 on a bracket 43, said lugs being provided with bearings for the shaft 41, the body portion 43 of said bracket being provided with an open-sided slot 44 formed in a side thereof, which slidably engages a bar 45 which extends transversely of the blank separating machine D, the ends of which are secured in the side frames thereof. Said bracket 42 is adapted to be secured in position corresponding to desired lateral adjustment of the pulley 39, by a set screw 46. Also mounted between the side plates of said bracket 43 on a stub shaft 47 in alignment with the pulley 39 is an idle pulley 48, the function of which will presently be explained. The pulley 40 is an idle pulley and is mounted to turn freely in a bracket 49 which is adjustable transversely of the machine A on a bar 50 secured to supports 51 which depend from the top $b$ of the frame of the machine A, the manner of supporting and adjustably securing said bracket 49 in position being substantially the same as the corresponding means applied to the bracket 42, as heretofore explained. Also, mounted on the bracket 49 in alignment with the pulley 40, is an idle pulley 52.

To avoid interference of the conveyor tape or belt 38 with operative parts of the machine A, mounted at the underside of the top $b$ of said machine and also to provide for quickly and conveniently detaching the bracket 49 from its supporting bar 50 in case it is desired to hand feed the machine, the lower lap of said tape or belt passes over the tops of the pulleys 48 and 52 and moves along the upper side of the top $b$ of the machine frame, the upper lap of said belt or tape resting directly upon said lower lap, as shown.

With the construction shown, it is obvious that when it is desired to hand feed the machine, the bracket 49 may be quickly and conveniently detached from the bar 50, thereby permitting both laps of the belt to be swung to one side into position where they will not interfere with hand feeding of the blanks.

In the operation of the machine, the tape or belt 38 runs continuously, being driven by suitable connection with the motor driven shaft 8, comprising a shaft 53 rotatably mounted in bearings on the frame of the machine A adjacent its lower end, as shown, secured to opposite ends of which are pulleys 54 and 55, adjusted to which, respectively, are belts 56 and 57 which are also adjusted, respectively, to pulleys 58, 58' on the shafts 8 and 41, respectively.

Blanks discharged from the blank separating machine D are delivered upon the exposed side of the upper lap of the tape or belt 38, and are held in frictional engagement therewith sufficient to insure their being fed therewith, by means comprising a pressure strip 59 preferably made of suitable light, flexible band metal supported at its ends in spaced relation to said tape and sufficiently long to permit it to sag into contact therewith, the relation being such that, for most of its length, said pressure strip will rest in contact with the upper lap of said tape or belt, as shown. To reduce friction between said pressure strip and conveyed blanks, a very smooth finish is imparted to the surface of said strip which contacts with said blanks in operation.

Preferably, also, said pressure means comprises balls 60 made of suitable relatively heavy material, as glass or metal, which are confined in tubular housings 61 secured to the upper surface of said pressure strip 59, holes 62 being formed in said pressure strip in register with said housings, of sufficient size to permit said balls to contact with conveyed blanks, the weight of said balls operating to hold said blanks in strong frictional engagement with the conveyor tape, but without producing any frictional drag on the blanks.

As shown, the means for supporting said pressure strip comprises rods 63 and 64, the ends of the rod 63 being secured in the side frames of the blank separating machine, and the rod 64 being secured at one end in a post or bracket 65 secured to the frame of the machine A and which extends inwardly over the top of said frame, as shown.

Simple and what I now consider preferable means for attaching said pressure strip to its supporting rods, consists of clamps 66 secured to opposite ends thereof, said clamps being provided with openings, respectively adapted to receive the rods 63 and 64, and which comprise clamping screws 67 for detachably securing said clamps and thus the ends of said pressure strips, to said supporting rods.

As installed for use, the end of the pressure strip 59 adjacent the blank separating machine D is supported in such relation to the pull-out rolls 17, 17' that blanks withdrawn from the blank separating machine by said pull-out rolls will be delivered into the converging angular opening formed between the said pressure strip and the upper lap of the belt or tape 38, as best shown in Fig. 4.

In accordance with my invention, imprinting position of conveyed blanks is defined by a guide 68, which aligns the blanks with the imprinting means $c$, and a stop 69 so positioned that it will stop and hold conveyed blanks when in imprinting position relative to said imprinting means.

In the preferable construction shown, the blank guide 68 consists of a plate 68' supported on the top of the machine frame A, having an upstanding flange $68^2$ on its rear edge, the front face of said flange, as shown, forming an angle with the plate 68' of slightly less than 90°, thereby preventing lifting of the edges of conveyed blanks when in contact with said flange. To adapt the machine for operating on blanks of different widths or for varying the position of imprint thereon, said blank guide is adjustably supported, thus providing for varying its position either frontwards or backwards, as may be desired, relative to the imprinting means. As shown, the means for supporting said blank guide consists of rods 70 which are slidably fitted to holes formed in blocks or posts 71 secured to the top of the frame B of the machine, the front ends of said rods being secured to blocks 72 secured to the flange $68^2$ of said blank guide. Said rods 70 may be secured in position corresponding to desired adjustments of said blank guide by set screws 73.

If for any reason desired—as when operating on relatively wide blanks—my invention contemplates the use of a second blank guide supported in front of the guide 68 and in spaced relation thereto. This construction is shown in Fig. 2 of the drawings, in which 74 designates said front guide, said guide consisting of an angle having an upstanding flange at its front edge, which with the flange $68^2$ on the blank guide 68 defines a guide channel for the conveyed blanks.

As shown, the end of said guide 74 at the receiving end of the conveyor is attached to the rod 63, as by clamping means 75 similar to the clamps 66, and which is also supported between its ends by a rod 76, the front end of which is secured to a block 77 secured to said front guide and which is slidable in a hole formed in the block 72 and is adapted to be secured in adjusted positions therein by a set screw 78. Also, the end of the guide 68 at the receiving end of the conveyor may be secured to the rod 63 by clamping means 66 in the same manner as the front guide 74.

To effect alignment of conveyed blanks with the imprinting means c, the conveyor tape 38 and the pressure strip 59 are installed at an angle to the blank guide 68, converging towards said guide from the receiving to the discharge end thereof, operating in a familiar manner to effect contact of the adjacent edges of conveyed blanks with said blank guide. As shown, also, the front guide 74 extends substantially parallel with the tape 38 and will supplement the action thereof in aligning conveyed blanks with the blank guide 68.

In handling relatively wide blanks, my invention contemplates the use of two conveyor belts or tapes 38 and associated pressure means, if considered necessary or desirable, said belts being spaced laterally from each other. Such additional conveyors will involve merely a duplication of the one shown and heretofore described and no description thereof is necessary.

As shown, the stops 69 for controlling movement of the blanks on which the machine A is operating, of which two are shown, consist of plates of suitable material, and each thereof is supported and actuated as follows:—Pivoted between spaced lugs on a bracket 79 secured to the top b of the machine frame B, rearwards from the imprinting means c, is a block 80 secured to which is a rod 81 which extends frontwards from said bracket over the top of the machine frame at the discharge side of said imprinting means. Mounted on said rod so as to be adjustable lengthwise thereof, are blocks 82 secured in which so as to be adjustable endwise thereon, are rods 85 which extend substantially at right angles to the rod 81 and secured to the ends of which proximate the imprinting means c, are the stops 69.

Within contemplated limits, the rod 81 is free to turn pivotally, being normally maintained by gravity at the lower limit of its movement, defined by contact of the lower ends of the stops 69 with the top of the machine frame B, in which they will arrest movement of conveyed blanks in operative relation to the imprinting means c. Also, said rod is adapted to be raised to permit the discharge of blanks held by the stops 69 and then released, permitting said rod 81 together with the stops 69 to fall by gravity to normal positions by means rendered operative and controlled by oscillation of the imprinting head C. As shown, said means consists of a spring clip 84 carried by the rod 81, said clip comprising spring arms secured to a block secured to said rod 81 and a rod 87 secured to a bar 88 on the head C arranged to enter between the spring arms on the downward stroke of said head, and to be gripped thereby with sufficient force to raise the free end of said rod 81 with the attachments thereto to release blanks held by the stops 69. When the head C attains a predetermined position in its raising movement, disengagement of the clip 84 and the rod 87 is effected, thereby again permitting the rod 81 to fall to normal position, by means consisting, as shown, of a lug 89 formed on and which projects rearwardly from the block 80, in position to contact with a rigid part of the bracket 79, thereby preventing further lifting movement of the rod 81 and operating, in an obvious manner, to effect disengagement of said rod and clip as the head C continues its raising movement.

As shown, also, the lower pull-out roll 17 is driven continuously by a belt 90 adjusted to pulleys 91 and 92 secured to the motor shaft 53 and the shaft of said lower pull-out roll, respectively.

I claim:

1. In combination, an imprinting machine comprising a suitable support frame, a rock shaft rotatable in bearings therein, a head secured to said rock shaft so as to oscillate therewith and constructed to overhang the top of said frame, imprinting means on said head, blank separating means of the type comprising a blank receptacle, a friction separator roll for discharging blanks from said receptacle, operating connection between the rock shaft of the imprinting machine and the separator roll of the blank separating means arranged to actuate said separator roll to discharge a blank at each oscillation of the imprinting head, only, and blank conveying means arranged to receive blanks from the blank separating means and to deliver them in printing position relative to the imprinting means on the imprinting head, a stop which defines printing position of conveyed blanks, means for movably maintaining said stop in operative position to arrest movement of conveyed blanks, and means rendered operative by oscillation of said imprinting head for moving said stop into position out of the path of movement of conveyed blanks and for releasing said stop and restoring it to operative position in the path of conveyed blanks.

2. The combination specified in claim 1, in which the operating connection between the rock shaft of the imprinting machine and the separator roll of the blank separating machine comprises a pinion on the separator roll shaft, a rack bar, means for slidably supporting said rack bar in engagement with said pinion, an arm secured to the rock shaft of the imprinting machine, a pivoted arm to which said rack bar is pivoted, means connecting said arms, and a ratchet gear applied to the pinion on the separator roll shaft comprising a member secured to said shaft, the relation being such that said pinion will idle when turned in one direction and will rotate said shaft to discharge a blank from the blank separating machine when turned in the opposite direction.

3. The combination specified in claim 1, which comprises pull-out rolls mounted in association with the separator roll of the blank separating machine and arranged to receive separated blanks therefrom, one of which is rotatable on a fixed axis and the other is movably supported, and which also comprises means for imparting movement to said movably supported pull-out roll to effect contact thereof with the other pull-out roll and to separate said rolls, the relation being such that said pull-out rolls will be separated when the separator roll is actuated to discharge a blank, and means for continuously rotating the pull-out roll the axis of which is fixed, in operation.

4. The combination specified in claim 1, which comprises pull-out rolls mounted in association with the separator roll of the blank separating machine and arranged to receive separated blanks therefrom, one of said rolls being rotatable on a fixed axis, means for movably supporting the other pull-out roll comprising a rotatable shaft, arms secured thereto in which said movably supported pull-out roll is rotatably mounted, means for maintaining said movably supported pull-out roll yieldingly in contact with the other pull-out roll, the operating connection between the rock shaft of the imprinting machine and the separator roll of the blank separating machine comprising a pivoted arm which oscillates in operation, and means connecting said arm and the shaft which supports the movable pull-out roll for imparting movement thereto to separate said pull-out rolls.

5. The combination specified in claim 1, which comprises pull-out rolls mounted in association with the separator roll of the blank separating machine and arranged to receive separated blanks therefrom, one of said rolls being rotatable on a fixed axis, means for movably supporting the other pull-out roll comprising a rotatable shaft, arms secured thereto in which said movably supported pull-out roll is rotatably mounted, means for maintaining said movably supported pull-out roll yieldingly in contact with the other pull-out roll, the operating connection between the rock shaft of the imprinting machine and the separator roll of the blank separating machine comprising a pivoted arm which oscillates in operation, and means connecting said arm and the shaft which supports the movable pull-out roll for imparting movement thereto to separate said pull-out rolls, comprising a stud pivoted to said arm, an arm secured to the shaft by which the movable pull-out roll is supported, a rod pivoted to said arm and which slidably engages a hole formed in said stud, and a head on said rod arranged in the path of said stud as the arm to which said stud is pivoted turns in a direction corresponding to discharge of a blank, the relation being such that contact of said stud with the head on said rod in operation will move said rod endwise a distance corresponding to contemplated separation of the pull-out rolls.

6. The combination specified in claim 1, which comprises pull-out rolls mounted in association with the separator roll of the blank separating machine and arranged to receive separated blanks therefrom, one of said rolls being rotatable on a fixed axis, means for movably supporting the other pull-out rolls comprising a rotatable shaft, arms secured thereto in which said movably supported pull-out roll is rotatably mounted, means for maintaining said movably supported pull-out roll yieldingly in contact with the other pull-out roll, the operating connection between the rock shaft of the imprinting machine and the separator roll of the blank separating machine comprising a pivoted arm which oscillates in operation, and means connecting said arm and the shaft which supports the movable pull-out roll for imparting movement thereto to separate said pull-out rolls, comprising a stud pivoted to said arm, an arm secured to the shaft by which the movable pull-out roll is supported, a rod pivoted to said arm and which slidably engages a hole formed in said stud, and a head on said rod which is axially adjustable thereon arranged in the path of said stud as the arm to which said stud is pivoted turns in a direction corresponding to discharge of a blank, the relation being such that contact of said stud with the head on said rod in operation will move said rod endwise a distance corresponding to contemplated separation of the pull-out rolls.

7. The combination specified in claim 1, the blank conveying means of which comprises an endless conveyor tape, pulleys to which said conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of said conveyor tape, pressure means for confining conveyed blanks on said tape and for producing necessary frictional engagement between said conveyor tape and blanks delivered thereon to effect feeding of said blanks by said tape, means for driving said tape continuously during operation, and means for effecting register of conveyed blanks with the imprinting means.

8. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of said conveyor tape, pressure means for confining conveyed blanks on said tape and for producing necessary frictional engagement between said conveyor tape and blanks delivered thereon to effect feeding of said blanks by said tape, means for driving said tape continuously during operation, and a guide which aligns with the imprinting means, said conveyor extending in such relation to said guide that contact of an edge of conveyed blanks with said guide will be effected.

9. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of said conveyor tape, pressure means for confining conveyed blanks on said tape and for producing necessary frictional engagement between said conveyor tape and blanks delivered thereon to effect feeding of said blanks by said tape, means for driving said tape continuously during operation, and a guide which aligns with the imprinting means, said conveyor tape converging from its receiving end towards said guide.

10. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of the conveyor tape, pressure means for confining conveyed blanks on said tape and for producing necessary frictional engagement between said conveyor tape and blanks delivered thereon to effect feeding of said blanks by said tape, means for driving said tape continuously during operation, and a laterally adjustable guide arranged to co-operate with the conveyor tape to align conveyed blanks with the imprinting means.

11. The combination specified in claim 1, the blank conveying means of which comprises an endless tape, pulleys to which said conveyor tape is adjusted, means for rotatably mounting said pulleys the relation being such that both laps of said tape will traverse the top of the frame of the imprinting machine in superposed relation and blanks discharged from the blank separating machine will be delivered upon the upper surface of the upper lap of said conveyor tape.

12. The combination specified in claim 1, the blank conveying means of which comprises an endless conveyor tape, pulleys to which said conveyor tape is adjusted, brackets in which said pulleys are rotatably mounted, means for supporting said brackets and pulleys arranged to provide for adjusting the same transversely to the path of movement of conveyed blanks.

13. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper lap of the conveyor tape, pressure means for confining conveyed blanks on said tape and for producing necessary frictional engagement between said conveyor tape and blanks delivered thereon to effect feeding of said blanks by said tape, comprising a strip of suitable flexible material supported at its ends and of such length and so arranged that it will sag into contact with the top lap of the conveyor tape, whereby said tape and also conveyed blanks will sustain the weight of said strip.

14. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of the conveyor tape, pressure means for confining conveyed blanks on said tape and for producing necessary frictional engagement between said conveyor tape and blanks delivered thereon to effect feeding of said blanks by said tape, comprising a strip of suitable flexible material supported at its ends in spaced relation to the conveyor tape and of such length and so arranged that it will sag into contact with the top lap of the conveyor tape, whereby said tape will sustain the weight of said strip.

15. The combination specified in claim 1, the blank conveying means of which comprises an endless conveyor tape, pulleys to which the conveyor tape is adjusted, means for rotatably mounting said pulleys, the relation being such that a lap of said tape will traverse the top of the frame of the imprinting machine and blanks discharged from the blank separating machine will be delivered upon the upper surface of the upper lap of the conveyor tape, pressure means for confining conveyed blanks on said tape and for producing necessary frictional engagement between said conveyor tape and blanks delivered thereon to effect feeding of said blanks by said tape, comprising a strip of suitable flexible material supported at its ends and of such length and so arranged that it will sag into contact with the top lap of the conveyor tape, whereby said tape will sustain the weight of said strip, hollow ball-housings secured to said pressure strip, and balls of relatively heavy material confined therein, said pressure strip being provided with holes in register with said hollow housings permitting balls confined therein to contact with the conveyor tape and conveyed blanks.

16. The combination specified in claim 1, the stop mechanism of which comprises a rod pivoted to a bracket on the frame of the imprinting machine at the discharge side thereof, a stop proper on said rod, gravity operating to maintain said rod at the lower limit of its movement defined by contact of the stop proper with the frame of the imprinting machine, means for raising said rod and stop proper to release conveyed blanks held thereby in imprinting position, comprising means for frictionally engaging said stop rod with the imprinting head when said head is depressed, and a stop which limits raising movement of said stop rod with said imprinting head arranged to effect disengagement of said stop rod from said imprinting head, thereby releasing said stop rod and permitting it to fall by gravity to return the stop proper to operative position.

17. The combination specified in claim 1, the stop mechanism of which comprises a rod pivoted to a bracket on the frame of the imprinting machine at the discharge side thereof, a stop proper on said rod, gravity operating to maintain said rod at the lower limit of its movement defined by contact of the stop proper with the frame of the imprinting machine, and means for raising said rod and stop proper to release conveyed blanks held thereby in imprinting position, comprising a spring clip arranged to frictionally engaging said stop rod with the imprinting head when said head is depressed, and a stop which limits raising movement of said stop rod with said imprinting head arranged to effect disengagement of said stop rod from said imprinting head, thereby releasing said stop rod and permitting it to fall by gravity to return the stop proper to operative position.

18. The combination specified in claim 1, the blank conveying means of which comprises an endless conveyor tape, pulleys to which said conveyor tape is adjusted, brackets in which said pulleys are rotatably mounted, the relation being such that both laps of said conveyor tape will traverse the top of the frame of the imprinting machine in superposed relation, and means for detachably supporting the bracket at the discharge end of the machine to provide for releasing the discharge end of the conveyor tape to move it clear of the imprinting means.

WILLIAM WARD DAVIDSON.